(12) United States Patent
Brauer et al.

(10) Patent No.: US 8,340,936 B2
(45) Date of Patent: Dec. 25, 2012

(54) METHODS AND SYSTEMS FOR LOCATING TARGETS

(75) Inventors: Timothy G. Brauer, Carrollton, TX (US); Charles J. Pruszynski, McKinney, TX (US); Mark S. Svane, Tioga, TX (US)

(73) Assignee: Raytheon Company, Waltham, MA (US)

( * ) Notice: Subject to any disclaimer, the term of this patent is extended or adjusted under 35 U.S.C. 154(b) by 458 days.

(21) Appl. No.: 12/641,799

(22) Filed: Dec. 18, 2009

(65) Prior Publication Data
US 2010/0318322 A1     Dec. 16, 2010

Related U.S. Application Data

(60) Provisional application No. 61/186,499, filed on Jun. 12, 2009.

(51) Int. Cl.
G06F 19/00     (2011.01)
(52) U.S. Cl. .......................................................... 702/94
(58) Field of Classification Search .................... 702/94, 702/150; 701/207, 213; 342/571.01
See application file for complete search history.

(56) References Cited

U.S. PATENT DOCUMENTS

| | | | |
|---|---|---|---|
| 4,203,163 A | 5/1980 | Key, Jr. | 367/125 |
| 4,647,761 A | 3/1987 | Cojan et al. | 250/203 R |
| 5,252,980 A | 10/1993 | Gray et al. | 342/59 |
| 5,736,960 A * | 4/1998 | Murphy et al. | 342/357.42 |
| 6,064,942 A | 5/2000 | Johnson et al. | 701/213 |
| 6,362,775 B1 | 3/2002 | Goebel et al. | 342/64 |
| 6,744,397 B1 | 6/2004 | Hager et al. | 342/55 |
| 7,209,752 B2 | 4/2007 | Myllymäki et al. | 455/456.1 |
| 7,359,038 B1 | 4/2008 | Donoghue et al. | 356/4.08 |
| 7,782,247 B1 | 8/2010 | VanLaningham et al. | 342/118 |
| 2004/0041999 A1 | 3/2004 | Hogan et al. | 356/141.5 |
| 2005/0253928 A1 | 11/2005 | McKeown et al. | 348/164 |

FOREIGN PATENT DOCUMENTS

DE     26 20 687 C1     5/1991

OTHER PUBLICATIONS

*PCT Notification of Transmittal of the International Search Report and the Written Opinion of the International Searching Authority* for International Application No. PCT/US2010/037883; 10 pages, Mar. 18, 2011.
"International Application Serial No. PCT/US2010/037883, international Preliminary Report on Patentability mailed Dec. 12, 2011", 7 pgs.
"International Application Serial No. PCT/US2010/037883, International Search Report mailed Mar. 18, 2011", 2 pgs.
"International Application Serial No. PCT/US2010/037883, Written Opinion mailed Mar. 18, 2011", 6 pgs.

\* cited by examiner

*Primary Examiner* — Bryan Bui
(74) *Attorney, Agent, or Firm* — Schwegman Lundberg & Woessner, P.A.

(57) ABSTRACT

A system target location includes one or more sensors operable to determine a location of a target and generate a set of coordinates corresponding to the target. The system further includes a system controller operable to receive one or more sets of coordinates from the one or more sensors, generate a combined estimate of the target location, and validate that each of the sets of coordinates correspond to the same target.

20 Claims, 2 Drawing Sheets

US 8,340,936 B2

METHODS AND SYSTEMS FOR LOCATING TARGETS

CROSS REFERENCE TO RELATED APPLICATION

This application claims the benefit of U.S. Provisional Application No. 61/186,499 filed Jun. 12, 2009, which is incorporated by reference in its entirety herein.

GOVERNMENT RIGHTS

This invention was made with Government support under the terms of Contract No. DAAB07-00-D-J607 awarded by the Communications-Electronics Life Cycle Management Command of the U.S. Army. The U.S. Government may have certain rights in this invention.

TECHNICAL FIELD OF THE INVENTION

This invention relates generally to target location and more particularly to a method and system for determining the location of a target using multiple location estimates.

BACKGROUND OF THE INVENTION

When locating targets for munitions guidance, resource allocation, or reconnaissance, it is desired to determine the location of a target with as much accuracy as possible. Current methods and systems for Far Target Location induce significant measurement errors into the calculations of the location of a target, due, in part, to inaccuracies in determining the bearing to the target. Current technology to achieve higher accuracy and precision requires the use of expensive north seeking modules which, in addition to cost, require hardware modification to existing measurement platforms. As a result, significant improvements in accuracy currently elude Far Target Location systems.

SUMMARY OF THE INVENTION

The present invention provides a method and system for target location that substantially eliminates or reduces at least some of the disadvantages and problems associated with previous methods and systems for target location.

In accordance with one embodiment of the present invention, a method for target location includes receiving from a first sensor, a first set of coordinates corresponding to a first estimated target location of a target. The method also includes receiving, from a second sensor, a second set of coordinates corresponding to a second estimated target location of the target. Further, the method includes generating at a system controller, a combined estimated target location based on the first set of coordinates and the second set of coordinates. The method also includes validating that each of the first set of coordinates and the second set of coordinates correspond to the same target.

In accordance with another embodiment of the present invention, a system for target location includes a first sensor capable of determining a first estimated target location of a target, and generating a first set of coordinates corresponding to the first estimated target location. The system also includes a second sensor capable of determining a second estimated target location of the target, and generating a second set of coordinates corresponding to the second estimated target location. Additionally, the system includes a system controller capable of receiving the first set of coordinates from the first sensor and the second set of coordinates from the second sensor. The system controller is additionally capable of generating a combined estimated target location, based on the first set of coordinates and the second set of coordinates and validate that each of the first set of coordinates and the second set of coordinates correspond to the same target.

Important technical advantages of certain aspects of the present invention include using multiple estimates of a target location to determine a combined estimate of the location of a target. Using multiple information sources may significantly increase the accuracy with which the location of a target is determined. Additionally, validating that the estimated locations are of the same target, may ensure that calculation errors are not introduced when determining the location of a target and that the combined estimate is a plausible result. Additionally, using multiple networked sensors may achieve improvements in target location accuracy without significant hardware purchases or modifications to existing measurement platforms.

Other technical advantages of the present invention will be readily apparent to one skilled in the art from the following figures, description, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
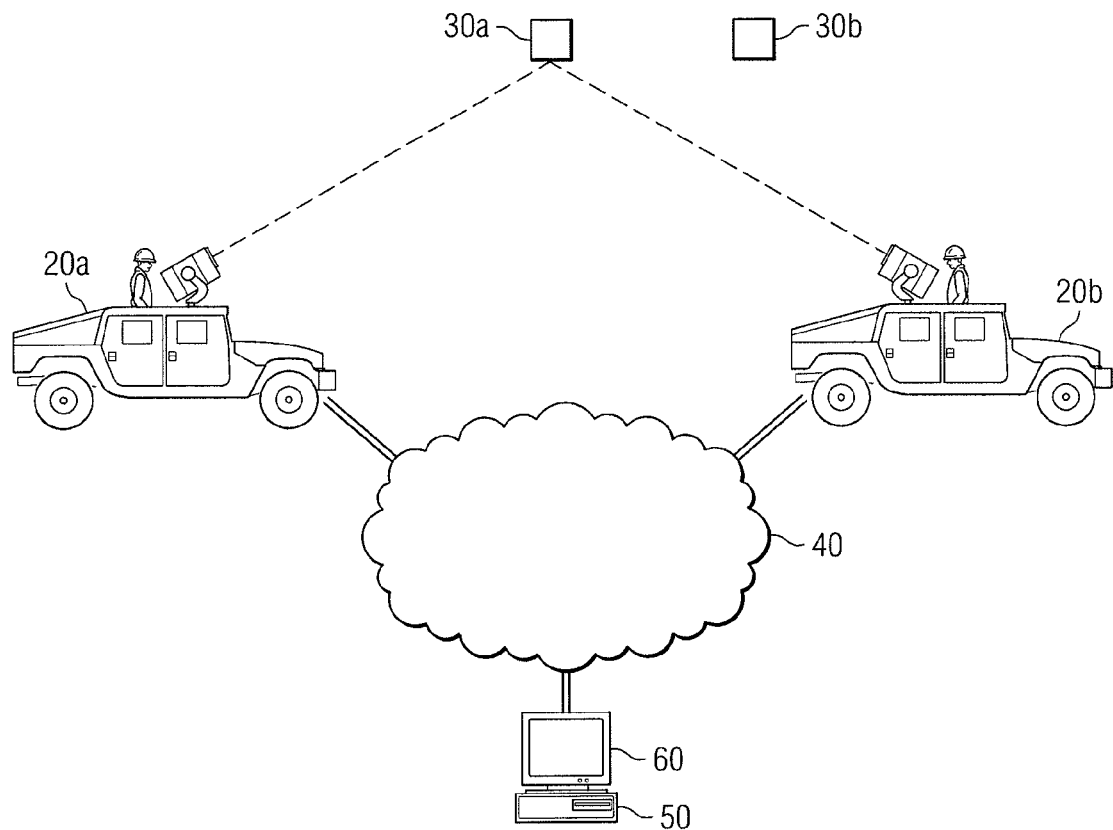
FIG. 1 is a block diagram illustrating a target location system, including a system controller, sensors, a network, and a display.

FIG. 1 illustrates a particular embodiment of a target location system 10 for locating targets 30. Target location system 10 includes sensors 20, a network 40, and a system controller 50. To facilitate accurate location of targets 30, target location system 10 determines an estimated location of a selected target 30 from one or more sensors 20, calculates an error associated with each of the estimated locations, combines the estimated locations, and compares the combined estimated locations to the estimated location from the one or more sensors 20.

Sensors 20a and 20b (which may be referred to individually as a "sensor 20" or collectively as "sensors 20") detect targets 30 and generate information regarding detected targets 30. Sensors 20 may be capable of performing measurements to determine an estimated target location (ETL) of target 30, calculate error values associated with the ETL, and/or generate target location data (TLD) 25. Additionally, each sensor 20 in target location system 10 may be capable of determining an estimated location of itself. For example, sensors 20 may determine their locations and/or geospatial coordinates using embedded, on-board, or coupled Global Position System (GPS) transceivers. Determining the position of sensor 20 may enable sensor 20 to determine an ETL of target 30 relative to sensor 20, or an ETL of target 30 relative to latitude and longitude coordinates of a Military Earth coordinate system.

For example, a sensor 20 may determine an estimated target location (ETL) of a particular target 30 by measuring the distance or range to target 30 relative to sensor 20, the azimuth angle to target 30 relative to sensor 20, and/or the altitude or elevation of target 30 relative to sensor 20, and combining the one or more measurements to generate a two- or three-dimensional set of coordinates. For example, based on the range to target 30 relative to sensor 20 and the azimuth angle to target 30 relative to sensor 20, sensor 20 may generate a set of (x, y) coordinates corresponding to the longitude and latitude of target 30. In particular embodiments, a sensor 20 may also measure the altitude of target 30 relative to that sensor 20 and may generate a set of three dimensional set of (x, y, z) coordinates, corresponding to the longitude, latitude, and elevation of the detected target 30.

Additionally, for any given measurement, sensor 20 may calculate an error value associated with the measurement. For example, in particular embodiments, sensor 20 may calculate an error distribution such as a normal distribution, a Gaussian distribution, or any other appropriate statistical distribution based on a particular measurement taken by sensor 20. Additionally, sensor 20 may generate an error distribution associated with the ETL. In particular embodiments, one or more of the error distributions calculated by sensor 20 may comprise a multivariate distribution to account for error along more than one axis.

In particular embodiments, sensor 20 may generate other types of error calculations and/or measurements based on the ETL, such as a Circular Error Probability (CEP). The CEP may represent a 50% probability that the ETL of target 30 is located within a circle defined by a given radius, and centered on the true location of target 30. For example, sensor 20 may generate an ETL for target 30 with a CEP of 50 meters. Thus, the ETL of target 30 has a 50% chance of lying within a circle with a radius of 50 meters centered on the true location of target 30. In particular embodiments, sensor 20 may estimate a two dimensional (i.e., range and azimuth angle) location of target 30 with a CEP of 50 meters, and a third dimensional location (i.e., range, azimuth, and elevation of target 30 relative to sensor 20) with a CEP of approximately 30 m. Range measurements to target 30 from sensor 20 may be more accurate than azimuth angle measurements in particular embodiments, and so, the CEP may be elliptically shaped. More generally, however, sensor 20 may calculate and/or generate any appropriate error values associated with the measurements made by sensor 20 and/or the ETL generated by sensor 20. Furthermore, sensor 20 may use the ETL and any associated error values (such as an error distribution or a CEP) to generate TLD 25.

Sensors 20 may measure distances, bearings, and/or other parameters associated with target 30 using any appropriate components and techniques. For example, in particular embodiments, a sensor 20 may determine the range to target 30 using a laser range finder or any other appropriate device or method suitable to determine a distance to target 30 relative to sensor 20. Sensor 20 may determine the azimuth angle to target 30 using a GPS Interferometer Subsystem (GPSIS) or any other appropriate device or technique suitable to determine the azimuth angle to target 30. Sensor 20 may determine the altitude of target 30 relative to sensor 20 by using a two-axis pitch-roll inclinometer or any other appropriate device or method suitable to measure the altitude of target 30. In particular embodiments of target location system 10, sensor 20 may obtain some, none or all of these measurements, and may obtain additional measurements to determine an estimated location of target 30 and any associated error values.

In general, sensor 20 may represent or include any type of device appropriate to determine an estimated target location (ETL) of target 30, including but not limited to, satellite-imaging systems, radar-imaging systems, infrared-imaging systems, sonar-imaging systems, x-ray-imaging systems, video cameras and/or imaging systems having object-recognition and identification technology. In particular embodiments, sensors 20 may represent one or more Long Range Scout Surveillance Systems. More generally, sensor 20 may represent any appropriate combination of hardware and/or software, including, but not limited to, logic encoded on tangible storage media that is operable when executed on a processor and/or other computer hardware to perform the described functions.

Sensors 20 may be located in any location suitable for determining the location of target 30, including but not limited to airborne sensors, vehicle-mounted sensors, underwater sensors, or extra-terrestrial sensors. In particular embodiments, sensors 20 communicate with other sensors 20 and/or system controller 50 over network 40. Sensor 20 may couple to other sensors 20 and/or system controller 50 through a dedicated connection (wired or wireless), or may connect to other components of target location system 10 only as necessary to transmit target location and measurement error data. Although FIG. 1 illustrates for purposes of example a target location system 10 that includes two sensors 20, alternative embodiments of target location system 10 may include any appropriate number and suitable types of sensors 20. For example, in particular embodiments, sensors 20a and 20b may represent a single sensor 20 determining the location of target 30 from two different positions. In such embodiments, sensor 20 may determine the location of target 30 as measured from a first position and then move to a second position. Sensor 20 may then determine the location of target 30 as measured from the second position. Thus, in such embodiments, sensor 20a represents the first position of sensor 20, and sensor 20b represents the second position of sensor 20.

Target location data (TLD) 25 represents data describing the estimated target location of target 30 and associated error values. In particular embodiments, TLD 25 may include two- or three-dimensional coordinates representing the ETL of target 30. Additionally, TLD may include error one or more values such as an error distribution, a CEP, or any other appropriate error values associated with the ETL. TLD 25 are generated by sensors 20, and may be transmitted to other sensors 20 and/or system controller 50 through network 40. In particular embodiments, TLD 25 may include a photographic representation of target 30. Furthermore, depending on the configuration and capabilities of sensors 20 and target location system 10 generally, TLD 25 may represent data transmitted by sensors 20 as a file, in a datastream, as a series of one or more packets, as written or verbal communication, or as information structured in any other suitable manner.

Targets 30a and 30b (which may be referred to individually as a "target 30" or collectively as "targets 30") represent any object suitable for detection, location, processing and/or analysis by target location system 10. In particular operating environments, multiple potential targets 30 may be present (e.g., a convoy of trucks, multiple aircraft on a runway, several buildings in a complex, or different sides of the same building). Thus, particular sensors 20 may inadvertently measure the ETL of different targets 30, which may lead to significant computational errors and mistakes in locating target 30. As a result, in the illustrated embodiment, target 30a represents an intended target 30, while target 30b represents an unintended target 30. For purposes of this description, intended target may refer to a target 30 for which sensor 20 is intending to determine an ETL. Unintended target may refer to a target 30 for which the ETL is unintentionally determined instead.

Additionally, targets 30 may represent any moving or stationary objects. For example, targets 30 may each represent a ground-based moving or stationary vehicle, such as a tank, mobile troop transport, truck, tanker, car or anything other appropriate vehicle. Targets 30 may also represent stationary or moving water-borne or airborne vehicle. Targets 30 may also represent any fixed structural object, such as a building, wall, barrier, bridge, weapon installation, and/or element of nature. Although FIG. 1 illustrates for purposes of example two targets 30, alternative embodiments of system 10 may include any appropriate number and/or types of targets 30. For example, particular embodiments of target location system 10 may by configured to locate one, two, or multiple targets 30 simultaneously.

Network 40 represents any form of communication network supporting circuit-switched, packet-based, serial, and/or any other suitable type of communication. Network 40 may represent a communication network operating via wired or wireless transmission and reception means. In particular embodiments, network 40 may represent a combination of network elements transmitting and/or receiving over wireless and/or wired connections. Although shown in FIG. 1 as a single element, network 40 may represent one or more separate networks including all or parts of various different networks that are separated and serve different sensors 20 and/or system controller 50. Network 40 may include routers, hubs, switches, gateways, call controllers, wireless receivers and transmitters, antennas, serial cables, Ethernet cables, infrared transmitters and receivers, and/or any other suitable components in any suitable form or arrangement. In general, network 40 may comprise any combination of public or private communication equipment such as elements of the public switched telephone network (PSTN), a global computer network such as the Internet, a local area network (LAN), a wide area network (WAN), or other appropriate communication equipment. Network 40 may additionally represent human-to-human interaction over two-way radio, telephone, telegraph, written messages, and/or any other appropriate communication medium.

Additionally, although FIG. 1 indicates a particular configuration of elements directly coupled to and/or interacting with network 40, network 40 may couple directly or indirectly and/or interact with any appropriate elements of target location system 10. Thus, the components of system 10 may be arranged and configured in any appropriate manner to communicate with one another over network 40 and/or over direct connections between the relevant components.

System controller 50 receives one or more sets of TLD 25 from each of sensors 20a and 20b, combines the TLD 25 to produce a single ETL of target 30, and determines a statistical probability that the combined ETL is a reasonable estimate that matches the target 30 measured by each sensor 20. In particular embodiments of target location system 10, system controller receives TLD 25 from one or more sensors 20, an estimated self-position measurement from one or more sensors 20, and an error values associated with each measurement. As noted above, TLD 25 may include data representing the ETL of target 30, which may be represented by longitude and latitude coordinates, Military Earth coordinates, and/or measurements such as range, azimuth angle, and elevation of target 30 relative to the received self-position of sensor 20. Additionally, as noted above, TLD 25 may include a CEP associated with the ETL. System controller 50 may then combine the ETL included in each received TLD 25 for a particular target 30 to calculate a combined ETL of target 30. System controller 50 may combine the received ETLs through any statistical method, including, but not limited to, a linear Kalman filter, linear Bayes' filter, and a non-linear Kalman filter.

System controller 50 may additionally perform a validity test to ensure that the received ETLs are of the same target 30. As noted above, in particular operating environments, sensors 20a and 20b may inadvertently measure the estimated location of different targets 30. Combining ETLs of target 30 without validating that the received ETLs are of the same target may lead to an erroneous combined ETL of target 30. Thus, system controller 50 may perform a validity test to ensure that the received measurements were of the same target 30. System controller 50 may perform the validity test using any appropriate statistical method, including, but not limited to, a chi-squared function and a Mahalanobis distance test.

Additionally, system controller 50 may represent a single component, multiple components located at a central location within target location system 10, and/or multiple components distributed throughout target location system 10. For example, system controller 50 may represent components or modules of one or more sensors 20 that are capable of communicating information between or among sensors 20. In general, system controller 50 may represent any appropriate combination of hardware and/or software, including, but not limited to, logic encoded on tangible storage media and operable when executed on a processor and/or other computer hardware to perform the described functions, and may further include components located on sensors 20 or other appropriate elements of target location system 10.

Display 60 receives information associated with a combined estimated target location (ETL) of target 30 from system controller 50 and displays this information. Additionally, display 60 may also receive and display a photographic representation of target 30 from system controller 50 and/or sensor 20. In particular embodiments, display 60 may display a text description of the location of target 30. For example, display 60 may display in text form the longitude and latitude of target 30. Additionally, display 60 may designate the location of target 30 relative to a map and may also display a photographic representation of target 30 on the map. Display 60 may additionally be configured to toggle between one or more types of displays of the location of target 30, depending on the capabilities and configuration of target location system 10. Furthermore, display 60 may be coupled to system controller 50, or may be remote from system controller 60 and in communication with system controller 50 over network 40 or a direct connection with system controller.

Examples of display 60 include, but are not limited to, a computer monitor, a laptop display, a television, a radar imaging display, or any other hardware device suitable for displaying electronic images. In general, display 60 may be any appropriate combination of hardware and/or software suitable for displaying an estimated location of target 30 in target location system 10. Although FIG. 1 illustrates, for purposes of example, an embodiment of system 10 including a single display 60, alternative embodiments of target location system 10 may include any appropriate number and suitable types of display 60.

In operation, target location system 10 combines estimated target locations (ETL) generated by one or more sensors 20, calculates a combined ETL, and validates that each ETL is of the same target 30. In particular embodiments, target location system 10 may include one or more sensors 20 that each determine an ETL of target 30 and each determine error values associated with the ETL. By thus combining one or more ETLs of target 30, and verifying the one or more ETLs measurements received from sensors 20 are of the same target 30, target location system 10 may provide for significantly increased accuracy in target location. Such increased accuracy may be useful in munitions guidance, artillery aiming, and/or directing any resources to a given target.

An example of this process, as implemented by a particular embodiment of target location system 10, is illustrated in FIG. 1. As shown in FIG. 1, sensors 20a and 20b may determine a self-position to facilitate the location of target 30. As discussed above, sensors 20a and 20b may each be equipped with GPS transceivers that enable each sensor 20 to determine its location and/or coordinates. Determining the location of sensor 20 may then enable sensors 20a and 20b to determine an ETL of target 30 relative to each of sensors 20a and 20b.

As discussed above, sensor 20a may determine an ETL of target 30 by taking any appropriate measurements. For example, sensor 20a may determine an ETL of target 30 by measuring the distance or range from sensor 20a to target 30, the azimuth angle to target 30 relative to sensor 20a, and/or the altitude of target 30 relative to sensor 20a. Sensor 20 may then generate TLD 25, which includes the ETL and associated error calculations or measurements. In particular embodiments, sensor 20a may additionally include a photographic representation of target 30 in TLD 25. Sensor 20a may then transmit TLD 25 to sensor 20b. In particular embodiments, the photographic representation of target 30 may enable sensor 20a or a human operator of sensor 20b to visually identify target 30, and verify that the ETL in TLD 25 received from sensor 20a corresponds with the ETL measured by sensor 20b.

Sensor 20b may then determine an ETL of target 30 relative to sensor 20b, based on the ETL relative to sensor 20a included in received TLD 25. As with sensor 20a, sensor 20b may determine an ETL of target 30 by making any appropriate measurements including, but not limited to, measuring the distance or range to target 30 relative to sensor 20b, the azimuth angle to target 30 relative to sensor 20b, and/or the altitude of target 30 relative to sensor 20b.

As noted above, in particular embodiments of target location system 10, sensors 20a and 20b may represent the same sensor 20 measuring the location of target 30 from two different positions. In such embodiments of target location system 10, this sensor 20 estimates the location of target 30 from a first position, moves to a second position, and determines an ETL of target 30 from the second position. Thus, the advantages gained from having two measurements from two sensors 20, each in a single position, may also be achieved by having a single sensor 20 estimate the location of target 30 from two different positions.

Additionally, in certain embodiments of target location system 10, system controller 50 may transmit to each of sensors 20a and 20b information identifying target 30, and instruct sensors 20a and 20b to determine an ETL of target 30. To generate the instruction, and to sufficiently identify target 30, system controller 50 may transmit to sensors 20 and 20b an estimated longitude and latitude coordinates, a visual description, or any other identifying characteristics of target 30 suitable to identify a particular target 30. System controller 50 may transmit information identifying a prospective target 30 to one or more sensor 20 by electronically coupling to network 40, by connecting electronically directly to sensors 20, or by a human operator of system controller 50 transmitting any written or verbal communication to a human operator of sensors 20.

Once sensors 20a and 20b have both determined an ETL of target 30, sensors 20a and 20b transmit TLD 25, which includes the respective ETLs, to system controller 50. Sensors 20 may each transmit TLD 25 to system controller 50 by electronically coupling to network 40, by connecting electronically directly to system controller 50, or by a human operator of sensor 20 transmitting any written or verbal communication to a human operator of system controller 50. Upon receipt of TLDs 25 from one or more sensors 20, system controller 50 combines the ETL information included in each TLD 25 into a combined ETL of target 30. As discussed above, system controller 50 may combine the estimates using any appropriate statistical method including, but not limited to, a linear Kalman filter, linear Bayes' filter, and/or a non-linear Kalman filter. For example, system controller 50 may combine one or more ETLs generated by sensors 20 by applying a Kalman filter, initializing the Kalman filter with a first ETL and combining a second ETL using the update equations of the Kalman filter. In particular embodiments of target location system 10, system controller 50 combines more than two ETLs (i.e., ETLs generated from three or more sensors 20), the ETLs can be recursively combined by taking the last Kalman filter states and state covariance and updating them with ETL information from the next sensor 20. Once combined, system controller 50 may also generate an error distribution or other error values associated with the combined estimate. In particular embodiments, system controller 50 may generate a CEP, which, as noted above, may represent a 50% probability that the ETL of target 30 is located within a circle defined by a given radius, and centered on the true location of target 30. In particular embodiments, the error calculations or measurements may be an output of the statistical method used to combine the ETLs.

Additionally, system controller 50 may perform a validity test to verify that each of the ETLs generated by sensors 20 of target 30 were of the same target 30. As discussed above, in particular operating environments, sensors 20a and 20b may inadvertently estimate a location of different targets 30. For example, sensor 20a may generate an ETL of intended target 30a, and sensor 20b may inadvertently generate an ETL of unintended target 30b. Combining ETLs generated by sensors 20 without validating that the ETLs are of the same target 30 may lead to an erroneous combined ETL of target 30. Thus, a validity test may ensure that the received measurements are of the same target 30. The validity test may comprise comparing each of the one or more received ETLs of target 30 with the combined ETL and the associated error calculations or measurements of the combined ETL. For example, if a received ETL falls within the error distribution of the combined ETL, then system controller 50 may determine that the combined ETL is a reasonable solution that matches the one or more received ETLs. If the received ETL falls outside of the error distribution of the combined ETL, then system controller 50 may determine that the combined ETL is not a reasonable solution matching the one or more received ETLs.

Additionally, the one or more ETLs of target 30 generated by sensors 20 and their respective associated error calculations and measurements may be averaged before comparing with the combined estimated measurement. A validity test may be performed using any appropriate statistical method, including, but not limited to, a chi-square test or a Mahalanobis distance test. If system controller 50 determines that the ETLs generated by sensors 20 are not of the same target 30 or is otherwise unable to validate the received ETLs, system controller 50 may request one or more sensors 20 to generate new ETLs, adjust the received ETLs, and/or take any other appropriate remedial measures.

Once the ETLs of target 30 received from sensors 20 have been combined and validated, system controller 50 may transmit the combined ETL of target 30 to another device, system, or human operator. The combined ETL may be used for munitions guidance, artillery aiming, and/or in placing a resource in, on, or in communication with target 30. For example, system controller 50 may transmit the combined ETL of target 30 to display 60. Display 60 may then display the location of target 60 by listing in text form the coordinates of target 30, by designating the location of target 30 on a topographic or political map, and/or by displaying an photographic representation of target 30. As another example, system controller may transmit the location of target 30 directly to another device or system, such as a weapons system capable of delivering ammunition on the coordinates specified by the combined ETL of target 30.

Thus, by utilizing one or more sensors 20 to determine an estimate of the location of a target 30, and by using statistical methods to combine and validate the estimated target locations, system controller 50 facilitates increased accuracy in locating targets 30. In particular embodiments, target location system 10 may be capable of estimating a location of target 30 with a CEP of 25 meters or less at a distance of 10 kilometers. Moreover, increased accuracy accrues to target location system 10 without the need for expensive north-seeking modules. Additionally, target location system 10 may facilitate significantly increased accuracy in target handoff between different sensors 30 in target location system 10. For example, multiple users or sensors 20 of target location system 10 may verify that each user is referencing the same target 30 when assignment for a particular target 20 is passed between users of sensors 20. As a result, target location system 10 may provide numerous operational benefits. Nonetheless, particular embodiments may provide some, none, or all of these operational benefits.

Figure 2:
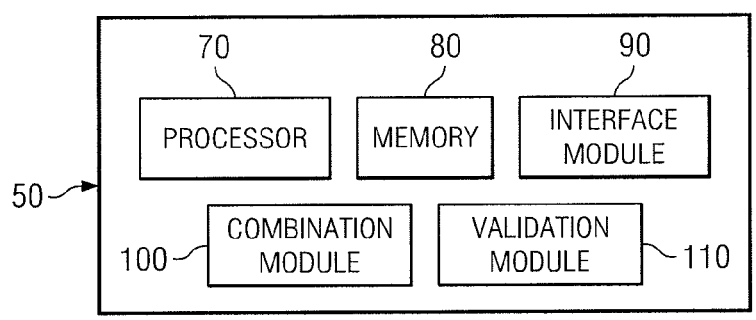
FIG. 2 is a block diagram illustrating the system controller of FIG. 1 in more detail, including aspects of an embodiment of the present invention.

FIG. 2 is a block diagram illustrating in greater detail the contents and operation of a particular embodiment of system controller 50 shown in FIG. 1. In general, as discussed above with respect to FIG. 1, system controller 50 receives TLDs 25 which include estimated target locations (ETLs) of target 30 from sensors 20, combines the received ETLs using a statistical combination method, validates the combined ETL using a statistical validation method, and transmits the combined ETL to display 60 and/or other device, system, or human operator. Moreover, as discussed above, system controller 50 may represent a single component, multiple components located at a central location within target location system 10, and/or multiple components distributed throughout target location system 10. For example, system controller 50 may represent components or modules of one or more sensors 20 that are capable of communicating information between or among sensors 20. As shown in FIG. 2, system controller 50 may include a processor 70, a memory 80, an interface module 90, a combination module 100, and a validation module 110.

Processor 70 may represent or include any form of processing component, including general purpose computers, dedicated microprocessors, or other processing devices capable of processing electronic information. Examples of processor 70 include digital signal processors (DSPs), application-specific integrated circuits (ASICs), field-programmable gate arrays (FPGAs), and any other suitable specific or general purpose processors. Although FIG. 2 illustrates a particular embodiment of system controller 70 that includes a single processor 70, system controller 50 may, in general, include any suitable number of processors 70.

Memory 80 stores processor instructions, instructions for combining estimated target locations, instructions for validating estimated target locations, and/or any values and/or parameters that system controller 50 utilizes during operation. Memory 80 may comprise any collection and arrangement of volatile or non-volatile components suitable for storing data. For example, memory may comprise random access memory (RAM) devices, read only memory (ROM) devices, magnetic storage devices, optical storage devices, or any other suitable data storage devices. In particular embodiments, memory 80 may represent, in part, computer-readable storage media on which computer instructions and/or logic are encoded. In such embodiments, some or all the described functionality of system controller 50 may be provided by processor 70 executing the instructions encoded on the described media. Although shown in FIG. 2 as a single component, memory 80 may represent any number of memory elements within, local to, or accessible by system controller 50. Additionally, although shown in FIG. 2 as being located internal to system controller 50, memory 80 may represent storage components remote from system controller 50, such as elements at a Network Attached Storage (NAS), Storage Area Network (SAN), or any other type of remote storage component.

Interface module 90 couples system controller 50 to appropriate components of target location system 10 to facilitate communication between system controller 50, sensors 20, display 60, and/or other appropriate components of target location system 10. For example, system controller 50 may receive TLD 25 from sensor 20 through interface module 90, or may transmit instructions to estimate a location of target 30 and information identifying target 30 to sensors 20 through interface module 90. In particular embodiments, interface module 90 may include or represent one or more interface cards suitable for communication over network 40, or a connection to an electronic bus. Additionally, although FIG. 2 illustrates a particular embodiment of system controller 50 that includes a single interface module 90, system controller 50 may, in general, include any suitable number of interface modules 90. For example, system controller 50 may include an interface module 90 for each sensor 20 that it is in communication with over network 40.

Combination module 100 combines ETLs of target 30 from one or more sensors 20, and combines the ETLs into a combined ETL of target 30. As discussed above, combination module 100 may combine the received estimates of the location of target 30 through any appropriate statistical method. In particular embodiments, combination module 100 may combine the estimates using a linear Kalman filter, linear Bayes' filter, and a non-linear Kalman filter. Additionally, the statistical method used to combine the received estimates may, depending on the method used, generate an error distribution, a CEP, or other error values associated with the combined estimate.

Validation module 110 determines whether each of the received ETLs of target 30 are of the same target 30. As discussed above, validation module 110 may validate the combined ETL by performing a validity test. The validity test may comprise comparing each of the one or more received estimates of the location of target 30 with the combined estimate and the error values associated with the combined estimate. If a received ETL falls within certain error parameters associated with the combined ETL (such as by falling within an expected error distribution for the combined ETL), then the combined ETL is a reasonable solution that matches the one or more received ETLs. If the received ETL falls outside of the error parameters of the combined ETL, then the combined ETL is not a reasonable solution that matches the one or more received ETLs. Additionally, the one or more ETLs of target 30 generated by sensors 20 and their respective associated error values may be averaged before comparing with the combined estimated measurement. A validity test may be performed using any appropriate statistical method, including, but not limited to, a chi-square test or a Mahalanobis distance test.

In general, each of processor 70, memory 80, interface module 90, combination module 100, and validation module 110 may represent any appropriate combination of hardware and/or software, including logic encoded on tangible media and executed on processor 70 and/or other computer hardware, suitable to provide the described functionality. Additionally, any two or more of interface module 90, combination module 100, and validation module 110 may represent or include common elements. In particular embodiments, interface module 90, combination module 100, and validation module 110 may represent, in whole or in part, software applications being executed by processor 70.

Figure 3:
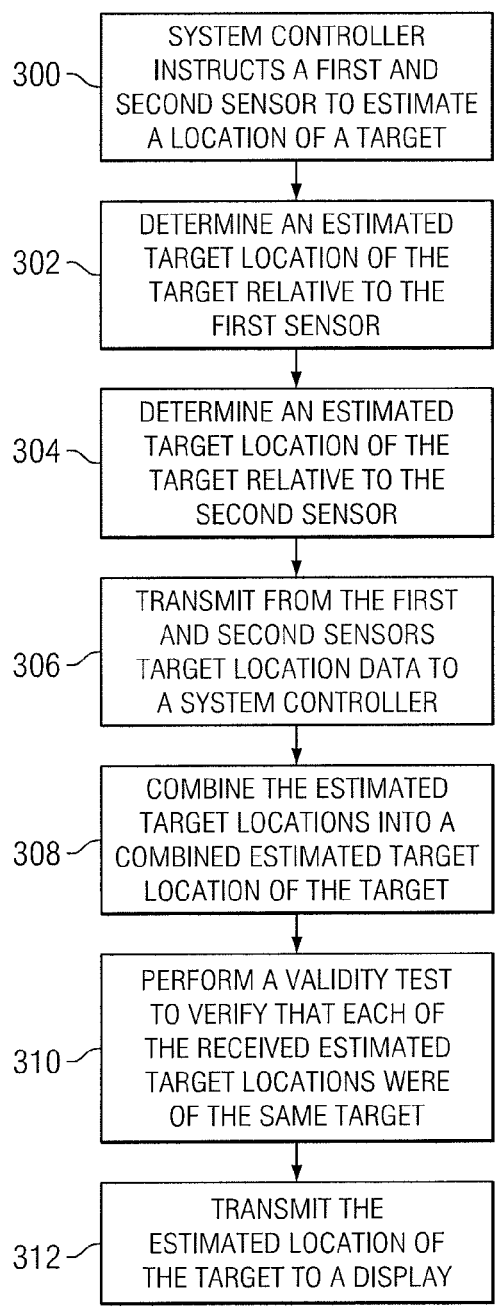
FIG. 3 is a flow chart illustrating a method for target location in accordance with an embodiment of the present invention.

FIG. 3 is a flowchart illustrating operation of a particular embodiment of target location system 10 in estimating the location of target 30. As described below, FIG. 3 illustrates a particular operation of target location system 10 in which system controller 50 issues instructions to one or more sensors 20 to determine an estimated location of target 30. As discussed below with respect to FIG. 4, target location system 10 may include additional embodiments in which one or more sensors 20 generate an ETL of target 30 and transmit the ETL to system controller 50. The steps illustrated in FIG. 3 may be combined, modified, or deleted where appropriate, and additional steps may also be added to those shown. Additionally, the steps may be performed in any suitable order without departing from the scope of the invention.

Operation, in the illustrated example, begins at step 300 with system controller 50 instructing sensor 20a to estimate a location of target 30. As noted above, system controller may instruct sensor 20a by sending electronic instructions through network 40, or by any written or verbal communication by a human operator of target location system 10. To identify target 30, system controller 50 may transmit to sensors 20 and 20b an estimated longitude and latitude coordinates, a photographic image, visual description, and/or any other identifying characteristics of target 30 suitable to identify a particular target 30.

At step 302, sensor 20a determines an estimated target location (ETL) of target 30. As discussed above, at appropriate points during operation, sensors 20a and 20b may determine their respective self-positions. Sensors 20a and 20b may each be equipped with or coupled to GPS receivers that enable each sensor 20 to determine its location and/or geospatial coordinates. Sensors 20a and 20b may determine their respective self-positions at any point during operation, either before or after receiving an instruction from system controller 50, and before or after changing locations. In particular embodiments, determining the location of sensor 20 may enable sensors 20a and 20b to determine an ETL of target 30 relative to each of sensors 20a and 20b. As discussed above, sensor 20a may determine an ETL of target 30 by taking any appropriate measurements in accordance with any appropriate method. For example, sensor 20a may determine an ETL of target 30 by measuring the distance or range to target 30 relative to sensor 20a, the azimuth angle to target 30 relative to sensor 20a, and/or the altitude of target 30 relative to sensor 20a. Sensor 20a may combine one or more of the measurements to generate a set of two or three dimensional coordinates.

At step 304, sensor 20b determines an estimated target location of target 30 relative to sensor 20b, based on the instructions and identifying information received from system controller 50. As with sensor 20a, sensor 20b may determine an estimated location of target 30 by measuring the distance or range to target 30 relative to sensor 20b, the azimuth angle to target 30 relative to sensor 20b, and/or the altitude of target 30 relative to sensor 20b. Further, sensor 20b may combine one or more of the measurements to generate a set of two or three dimensional coordinates. As noted above, in particular embodiments of target location system 10, sensors 20a and 20b may represent the same sensor 20 measuring the location of target 30 from two different positions. In such embodiments of target location system 10, sensor 20 may determine an ETL of target 30 from a first position, move to a second position, and determine a second ETL of target 30 from the second position. Thus, the advantages gained from having two measurements from two sensors 20, each in a single position, may also be achieved by having a single sensor 20 estimate the location of target 30 from two different positions.

In step 306, sensors 20a and 20b transmit TLD 25 to system controller 50. As discussed above, TLD 25 may include an ETL generated at the respective sensor 20, an error measurement or calculation associated with the ETL, and a photographic representation of target 30. Sensors 20 may transmit TLD 25 by electronically coupling to network 40, by connecting electronically directly to sensors 20, or by a human operator of sensor 20 transmitting any written or verbal communication to a human operator of system controller 50. In embodiments of target location system 10 in which system controller 50 represents components of sensor 20, transmitting an estimated location of target 30 to system controller 50 may represent transmission between or among one or more separate components of sensor 20. Additionally, a particular sensor 20 may transmit TLD 25 to another sensor 20, which may then transmit two TLDs 25 system controller 50.

Upon receipt of TLD 25 from one or more sensors 20, system controller 50 combines the ETL in each TLD 25 into a combined ETL of target 30 in step 308. As noted above, system controller 50 may utilize any appropriate statistical method to combine the received estimates, including, but not limited to a linear Kalman filter, a linear Bayes' filter, and/or a non-linear Kalman filter. System controller 50 may also generate an error distribution, a CEP, or other types of error values associated with the combined estimate. Additionally, as noted above, system controller 50 may also generate a CEP or other types of error calculations and/or measurements.

In step 310, system controller 50 performs a validity test to verify that each of ETLs of target 30 received from sensors 20a and 20b were of the same target 30. As discussed above, in particular operating environments, one or more sensors 20 may inadvertently estimate a location of different targets 30. For example, sensor 20a may estimate a location of intended target 30a, and sensor 20b may inadvertently estimate a location of unintended target 30b. Combining ETLs received from sensors 20a and 20b in this circumstance without validating that the received ETLs are of the same target 30 may lead to an erroneous combined ETL of target 30. Thus, a validity test may ensure that the received ETLs are of the same target 30. The validity test may comprise comparing each of the one or more received estimates of the location of target 30 with the combined ETL and error values associated with the combined ETL. Additionally, the one or more estimated locations of target 30 and their respective associated error values may be averaged before comparing with the combined estimated measurement. A validity test may be performed using any appropriate statistical method, including, but not limited to, a chi-square test or a Mahalanobis distance test.

In step 312, system controller 50 may transmits the estimated location of target 30 to display 60. As discussed above, display 60 may be coupled to system controller 50 or may communicate with system controller 50 via network 40. In particular embodiments, display 60 may display a text description of the location of target 30. For example, display 60 may display in text form the coordinates of target 30. Additionally, display 60 may designate the location of target 30 relative to an topographic or political map, and may display a photographic representation of target 30. Additionally, system controller may transmit the ETL of target 30 to any another appropriate device, system, or human operator. The estimated target location may be used for munitions guidance, artillery aiming, and/or in placing a resource in, on, or in communication with target 30.

Figure 4:
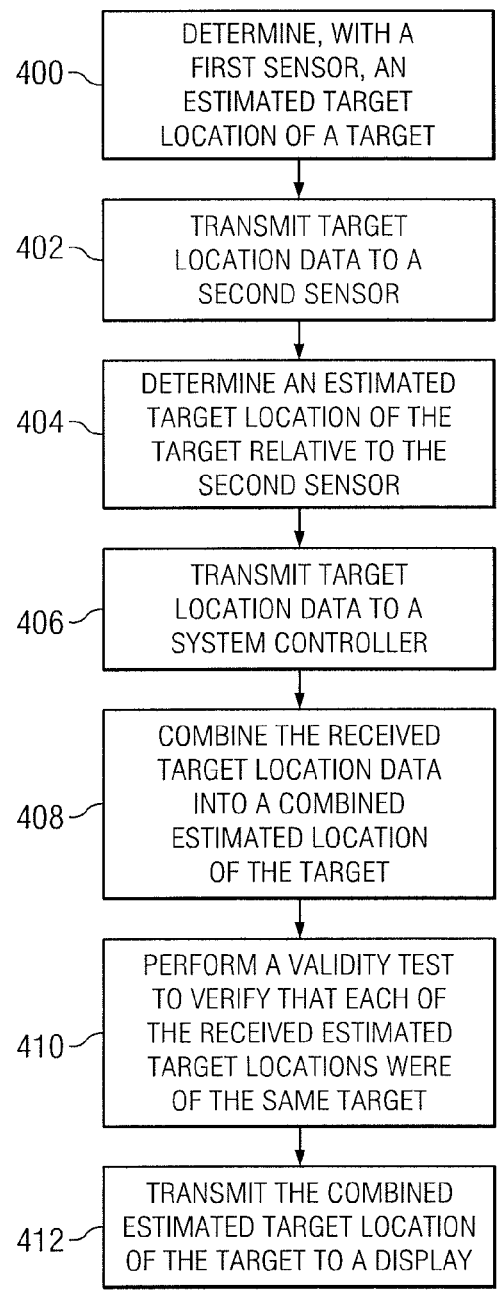
FIG. 4 is a flow chart illustrating a method for target location in accordance with an embodiment of the present invention.

FIG. 4 is a flowchart illustrating operation of a particular embodiment of target location system 10 in estimating the location of target 30. As described below, FIG. 4 illustrates a particular operation of target location system 10 in which sensor 20a estimates the location of target 30, transmits the estimated location to target 30, whereupon sensor 20b estimates the location of target 30, and then transmits both estimated locations to system controller 50. The steps illustrated in FIG. 4 may be combined, modified, or deleted where appropriate, and additional steps may also be added to those shown. Additionally, the steps may be performed in any suitable order without departing from the scope of the invention.

Operation, in the illustrated example, begins at step 400 with sensor 20a determining an estimated target location (ETL) of target 30. Sensor 20a may initiate target location in response to human operator input and/or in response to computer-generated input from sensor 20a and/or system controller 50. As discussed above, sensor 20a may determine an ETL of target 30 by taking any appropriate measurements in accordance with any appropriate method. For example, sensor 20a may determine an estimated location of target 30 by measuring the distance or range to target 30 relative to sensor 20a, the azimuth angle to target 30 relative to sensor 20a, the altitude of target 30 relative to sensor 20a, and/or any other appropriate measurements. Additionally, sensors 20a may record a photographic image of target 30.

In step 402, sensor 20a transmits TLD 25, which includes an ETL, one or more associated error values, and/or photographic image, to sensor 20b. Sensor 20a may transmit TLD 25 to sensor 20b by electronically coupling to network 40, by connecting electronically directly to sensor 20b, or by a human operator of sensor 20a transmitting any written or verbal communication to a human operator of sensor 20b. The photographic representation of target 30 may enable a human operator of sensor 20b to visually identify target 30, and verify that the ETL received from sensor 20a corresponds with sensor 20b's determination of the ETL of target 30.

In step 404, sensor 20b determines an ETL of target 30 relative to sensor 20b, based on the received ETL of target 30 relative to sensor 20a. As with sensor 20a, sensor 20b may determine an estimated location of target 30 by measuring the distance or range to target 30 relative to sensor 20b, the azimuth angle to target 30 relative to sensor 20b, the altitude of target 30 relative to sensor 20b, and/or any other appropriate measurements.

In step 406, sensors 20b transmits TLD 25 to system controller 50. In this example, TLD 25 may include an ETL and associated error values generated by sensor 20a and an ETL and associated error values generated by sensor 20b. Sensor 20b may transmit TLD 25 by electronically coupling to network 40, coupling directly to system controller 50, or by a human operator of sensor 20b transmitting any written or verbal communication to a human operator of system controller 50.

In step 408, system controller 50 combines the ETLs included in the received TLD 25 into a combined estimated location of target 30. As discussed above, system controller 50 may combine the ETLs using any appropriate statistical method. For example, system controller 50 may use a linear Kalman filter, linear Bayes' filter, and/or a non-linear Kalman filter. Once combined, system controller 50 may also generate an error values (such as an error distribution or CEP) associated with the combined ETL.

In step 410, system controller 50 perform a validity test to verify that each of the received ETLs of target 30 were of the same target 30. As discussed above, in particular operating environments, sensors 20a and 20b may inadvertently estimate a location of different targets 30. Thus, a validity test may ensure that the received ETLs are of the same target 30. The validity test may comprise comparing each of the one or more received ETLs of target 30 with the combined ETL generated by system controller 50 and the error values of the combined ETL. Additionally, the one or more ETLs of target 30 and their respective associated error values may be averaged before comparing with the combined ETL. A validity test may be performed using any appropriate statistical method, including, but not limited to, a chi-square test or a Mahalanobis distance test, to determine whether the error values associated with the ETLs satisfy certain error parameters associated with the combined ETL.

In step 412, system controller 50 may transmit the combined ETL of target 30 to display 60. As discussed above, display 60 may be coupled to system controller 50 or may communicate with system controller 50 via network 40. In particular embodiments, display 60 may display a text description of the location of target 30. For example, display 60 may display in text form the coordinates of longitude and latitude of target 30. Additionally, display 60 may designate the location of target 30 relative to an topographic or political map, and may display a photographic representation of target 30. Additionally, system controller may transmit the estimated location of target 30 to any another appropriate device, system, or human operator. The estimated target location may be used for munitions guidance, artillery aiming, and/or in placing a resource in, on, or in communication with target 30.

Although the present invention has been described in connection with several embodiments, it should be understood that a plenitude of changes, substitutions, variations, alterations, transformations, and modifications may be suggested to one of skill in the art, and it is intended that the present invention encompass such changes, substitutions, variations, alterations, transformations, and modifications as fall within the spirit and scope of the appended claims.

What is claimed is:

1. A target location system comprising:
   a first sensor operable to:
      determine a first estimated target location of a target; and
      generate a first set of coordinates corresponding to the first estimated target location;

a second sensor operable to:
  determine a second estimated target location of the target; and
  generate a second set of coordinates corresponding to the second estimated target location; and
a system controller operable to:
  receive the first set of coordinates from the first sensor;
  receive the second set of coordinates from the second sensor;
  generate a combined estimated target location, based on the first set of coordinates and the second set of coordinates;
  compare the first set of coordinates to the combined estimated target location; and
  compare the second set of coordinates to the combined estimated target location to validate that each of the first set of coordinates and the second set of coordinates correspond to the same target.

2. The target location system of claim 1, wherein the first sensor is operable to determine the first estimated target location by:
  determining a location of the first sensor;
  determining a distance from the first sensor to the target;
  determining an azimuth angle to the target relative to the first sensor; and
  determining the first estimated target location based, at least in part, on the location of the first sensor, the distance from the first sensor to the target, and the azimuth angle to the target relative to the first sensor.

3. The target location system of claim 2, wherein:
  the first sensor is further operable to determine an elevation of the target; and
  the first sensor is operable to determine the first estimated target location based at least in part on the elevation of the target.

4. The target location system of claim 1, wherein the system controller is operable to generate a combined estimated target location by combining the first set of coordinates and the second set of coordinates using a Kalman filter.

5. The target location system of claim 1, wherein the system controller is operable to:
  compare the first set of coordinates to the combined estimated target location by applying a chi-square test to the combined estimated target location and the first set of coordinates; and
  compare the second set of coordinates to the combined estimated target location by applying a chi-square test to the combined estimated target location and the second set of coordinates.

6. A method of locating targets, comprising:
  determining a first estimated target location of a target;
  generating a first set of coordinates corresponding to the first estimated target location;
  determining a second estimated target location of the target;
  generating a second set of coordinates corrersponding to the second estimated target location;
  generating, at a system controller, a combined estimated target location based on the first set of coordinates and the second set of coordinates;
  comparing the first set of coordinates to the combined estimated target location; and
  comparing the second set of coordinates to the combined estimated target location to validate, at the system controller that each of the first set of coordinates and the second set of coordinates correspond to the same target.

7. The method of claim 6, wherein determining the first estimated target location of the target comprises:
  determining a location of a sensor;
  determining a distance from the sensor to the target;
  determining an azimuth angle to the target relative to the sensor; and
  determining the first estimated target location based, at least in part, on the location of the sensor, the distance from the sensor to the target, and the azimuth angle to the target relative to the sensor.

8. The method of claim 7, further comprising determining an elevation of the target, and wherein determining the first estimated target location further comprises determining the first estimated target location based at least in part on the elevation of the target.

9. The method of claim 6, wherein generating a combined estimated target location comprises combining the first set of coordinates and the second set of coordinates using a Kalman filter.

10. The method of claim 6, wherein:
  comparing the first set of coordinates to the combined estimated target location comprises applying a chi-square test to the combined estimated target location and the first set of coordinates; and
  comparing the second set of coordinates to the combined estimated target location comprises applying a chi-square test to the combined estimated target location and the second set of coordinates.

11. A target location system comprising:
a sensor operable to:
  determine, from a first position, a first estimated target location of a target;
  determine, from a second position, a second estimated target location of the target;
  generate a first set of coordinates based on the first estimated target location; and
  generate a second set of coordinates based on the second estimated target location; and
a system controller operable to:
  receive, from the sensor, the first set of coordinates and the second set of coordinates;
  generate a combined estimated target location, based on the first set of coordinates and the second set of coordinates;
  compare the first set of coordinates to the combined estimated target location; and
  compare the second set of coordinates to the combined estimated target location to validate that each of the first set of coordinates and the second set of coordinates correspond to the same target.

12. The target location system of claim 11, wherein the sensor is operable to determine, from the first position, the first estimated target location of the target by:
  determining a location of the sensor while at the first position;
  determining a distance from the sensor to the target;
  determining an azimuth angle to the target relative to the sensor;
  determining the first estimated target location based, at least in part, on the location of the sensor while at the first point, the distance from the sensor to the target, and the azimuth angle to the target relative to the sensor.

13. The target location system of claim 12, wherein:
  the sensor is further operable to determine an elevation of the target; and the sensor is operable to determine the first estimated target location based at least in part on the elevation of the target.

14. The target location system of claim 11, wherein the system controller is operable to generate a combined estimated target location by combining the first set of coordinates and the second set of coordinates using a Kalman filter.

15. The target location system of claim 11, wherein the system controller is operable to:
- compare the first set of coordinates to the combined estimated target location by applying a chi-square test to the combined estimated target location and the first set of coordinates; and
- compare the second set of coordinates to the combined estimated target location by applying a chi-square test to the combined estimated target location and the second set of coordinates.

16. A system comprising:
a first sensor operable to:
- determine a first estimated target location of a target; and
- generate a first set of coordinates corresponding to the first estimated target location;

a second sensor operable to:
- determine a second estimated target location of the target; and
- generate a second set of coordinates corresponding to the second estimated target location; and logic encoded on a tangible computer-readable storage medium, the logic operable, when executed on a processor, to:
receive, from the first sensor, the first set of coordinates;
receive, from the second sensor, the second set of coordinates;
generate, at a system controller, a combined estimated target location based on the first set of coordinates and the second set of coordinates;
compare the first set of coordinates to the combined estimated target location; and
compare the second set of coordinates to the combined estimated target location to validate that each of the first set of coordinates and the second set of coordinates correspond to the same target.

17. The system of claim 16, wherein the first sensor is operable to:
- determine a location of the first sensor;
- determine a distance to the target from the first sensor;
- determine an azimuth angle to the target relative to the first sensor;
- determine the first estimated target location of the target based, at least in part, on the location of the first sensor, the distance to the target from the first sensor, and the azimuth angle to the target relative to the first sensor.

18. The system of claim 17, wherein:
the first sensor is further operable to determine an elevation of the target; and
the first sensor is further operable to determine the first estimated target location, based at least in part, on the elevation of the target.

19. The system of claim 16, wherein the logic is operable to generate a combined estimated target location by combining the first set of coordinates and the second set of coordinates using a Kalman filter.

20. The system of claim 16, wherein the logic is operable to:
- compare the first set of coordinates to the combined estimated target location by applying a chi-square test to the combined estimated target location and the first set of coordinates; and
- compare the second set of coordinates to the combined estimated target location by applying a chi-square test to the combined estimated target location and the second set of coordinates.

* * * * *

UNITED STATES PATENT AND TRADEMARK OFFICE
CERTIFICATE OF CORRECTION

Page 1 of 1

PATENT NO. : 8,340,936 B2
APPLICATION NO. : 12/641799
DATED : December 25, 2012
INVENTOR(S) : Brauer et al.

It is certified that error appears in the above-identified patent and that said Letters Patent is hereby corrected as shown below:

On the Title page, in column 2, under "Other Publications", line 5-6, delete "international" and insert --International--, therefor In the Specification In column 5, line 21, delete "by" and insert --be--, therefor In column 7, line 63, delete "20" and insert --20a--, therefor In column 9, line 34, delete "30" and insert --20--, therefor In column 9, line 37, delete "20" and insert --30--, therefor In column 9, line 44, before "shown", insert --as--, therefor In column 10, line 3, delete "70" and insert --50--, therefor In column 11, line 46, delete "20" and insert --20a--, therefor In column 12, line 42, after "transmit", delete "two", therefor In column 12, line 42, before "system", insert --to--, therefor In the Claims In column 15, line 55-56, in Claim 6, delete "target:" and insert --target;--, therefor In column 15, line 57, in Claim 6, delete "corrersponding" and insert --corresponding--, therefor Signed and Sealed this
Twenty-ninth Day of September, 2015

Michelle K. Lee
*Director of the United States Patent and Trademark Office*